US011897180B1

(12) United States Patent
Johnston, VII

(10) Patent No.: US 11,897,180 B1
(45) Date of Patent: Feb. 13, 2024

(54) HEATED POLYMERIC SHEET MATERIAL FEEDING PROCESS

(71) Applicant: Aerlyte, Inc., Petoskey, MI (US)

(72) Inventor: Christopher Johnston, VII, Petoskey, MI (US)

(73) Assignee: Aerlyte, Inc., Petoskey, MI (US)

( * ) Notice: Subject to any disclaimer, the term of this patent is extended or adjusted under 35 U.S.C. 154(b) by 0 days.

(21) Appl. No.: 18/110,158

(22) Filed: Feb. 15, 2023

Related U.S. Application Data

(63) Continuation of application No. 17/667,211, filed on Feb. 8, 2022, now Pat. No. 11,607,836.

(51) Int. Cl.
  *B29C 51/42* (2006.01)
  *B29C 51/10* (2006.01)
  *B29C 70/54* (2006.01)
  *B29C 51/08* (2006.01)
  *B29C 51/26* (2006.01)

(52) U.S. Cl.
  CPC ............ *B29C 51/421* (2013.01); *B29C 51/08* (2013.01); *B29C 51/10* (2013.01); *B29C 51/261* (2013.01); *B29C 70/54* (2013.01)

(58) Field of Classification Search
  CPC ....... B29C 70/461; B29C 70/46; B29C 70/56; B29C 70/54; B29C 51/421; B29C 51/08
  See application file for complete search history.

(56) References Cited

U.S. PATENT DOCUMENTS

| 2,934,317 | A | * | 4/1960 | Warnken | B29D 99/0025 416/248 |
| 3,025,566 | A |   | 3/1962 | Kostur  |  |
| 3,507,004 | A |   | 4/1970 | Taleff  |  |
| 4,378,265 | A | * | 3/1983 | Kiss    | B27N 5/00 264/119 |
| 4,432,716 | A | * | 2/1984 | Kiss    | B27N 5/00 425/383 |
| 4,447,373 | A |   | 5/1984 | Chappell et al. |  |

(Continued)

FOREIGN PATENT DOCUMENTS

DE   40 33 672 A1   4/1992
EP   3 168 036 A1   5/2017

OTHER PUBLICATIONS

Lee et al., "Effects of vacuum, mold temperature and cooling rate on mechanical properties of press consolidated glass fiber/PET composite," Composites, Part A, vol. 33, 2002, pp. 1107-1114.

(Continued)

*Primary Examiner* — Matthew J Daniels
(74) *Attorney, Agent, or Firm* — Brooks Kushman P.C.

(57) ABSTRACT

A rigid thermoplastic polymeric sheet material forming process. The process includes heating, while under a heating vacuum range, a rigid thermoplastic polymeric sheet in a heating zone to a forming temperature to form a heated rigid thermoplastic polymeric sheet material. The process further includes transferring, while under a feeding vacuum range, the heated rigid thermoplastic polymeric sheet material from the heating zone to feed the heated rigid thermoplastic polymeric sheet material into a forming zone under the feeding vacuum range. The process also includes forming, in the forming zone, the heated rigid thermoplastic sheet material into a formed article.

18 Claims, 8 Drawing Sheets

(56) References Cited

U.S. PATENT DOCUMENTS

| | | | |
|---|---|---|---|
| 4,689,105 A | 8/1987 | Fazlin et al. | |
| 4,855,097 A * | 8/1989 | Iseler | B29C 37/0064 |
| | | | 264/102 |
| 4,915,896 A | 4/1990 | Rachal | |
| 5,026,514 A * | 6/1991 | Hauwiller | B29D 99/0003 |
| | | | 264/258 |
| 5,047,198 A * | 9/1991 | Kim | B29C 33/02 |
| | | | 425/89 |
| 5,108,532 A | 4/1992 | Thein et al. | |
| 5,125,994 A | 6/1992 | Harasta et al. | |
| 5,151,233 A * | 9/1992 | Wendt | B26D 7/1827 |
| | | | 425/383 |
| 5,314,324 A * | 5/1994 | Wendt | B65B 61/02 |
| | | | 425/304 |
| 5,401,154 A * | 3/1995 | Sargent | B29C 43/34 |
| | | | 264/108 |
| 5,892,203 A | 4/1999 | Jordan et al. | |
| 6,007,888 A | 12/1999 | Kime | |
| 6,099,771 A | 8/2000 | Hudkins et al. | |
| 7,157,034 B2 | 1/2007 | Bristow et al. | |
| 2003/0075840 A1 * | 4/2003 | Hahn | B29C 43/56 |
| | | | 264/319 |
| 2003/0175520 A1 * | 9/2003 | Grutta | B29C 70/46 |
| | | | 264/237 |
| 2005/0161862 A1 * | 7/2005 | Westerlund | B29C 70/46 |
| | | | 264/319 |
| 2013/0008591 A1 * | 1/2013 | Kondo | B29C 51/06 |
| | | | 156/212 |
| 2013/0256941 A1 * | 10/2013 | Buehlmeyer | B29C 70/461 |
| | | | 425/384 |
| 2015/0008619 A1 * | 1/2015 | Maertiens | B29B 11/00 |
| | | | 264/319 |
| 2016/0354967 A1 * | 12/2016 | Ono | B29C 70/46 |
| 2019/0232577 A1 | 8/2019 | Kaji et al. | |
| 2019/0345299 A1 * | 11/2019 | Tice | C08J 5/243 |
| 2020/0346419 A1 * | 11/2020 | Rigamonti | B29C 37/001 |
| 2020/0376737 A1 * | 12/2020 | Kim | G05B 19/4155 |

OTHER PUBLICATIONS

Muzzy et al., "Thermoforming of High Performance Thermoplastic Composites," Polymer Composites, vol. 11, No. 5, Oct. 1990, pp. 280-285.

Productive Plastics, Inc., "Heavy Gauge Plastic, Pressure and Vacuum Thermoforming Process & Design Guide," accessed and printed from productiveplastics.com/request-design-guide/ on Nov. 2, 2020, 19 pages.

Rosen, "A History of the Growth of the Thermoforming Industry, Chapter I Thermoforming Pioneers 1930-1950," Thermoforming Quarterly, 2005, 3rd Quarter, 20 pages.

Universal Plastics, "Thermoforming Design Guidelines," Feb. 2014, www.universalplastics.com, 20 pages.

\* cited by examiner

HEATED POLYMERIC SHEET MATERIAL FEEDING PROCESS

CROSS-REFERENCE TO RELATED APPLICATIONS

This application is a continuation of U.S. application Ser. No. 17/667,211 filed Feb. 8, 2022, now U.S. Pat. No. 11,607,836 which issued on Mar. 21, 2023, the disclosure of which is hereby incorporated in its entirety by reference herein.

TECHNICAL FIELD

The present disclosure relates to a heated polymeric sheet material feeding process.

BACKGROUND

Polymeric materials may be formed into articles. Polymeric materials may be formed of thermoplastic materials or thermoset materials. The polymeric material may be a polymer matrix composite including reinforcing fibers. Non-limiting examples of articles that can be formed from polymeric materials include cosmetic, exterior automotive components (e.g., hoods, fenders, decklids, roofs, bumpers, and fascia), structural automotive components (e.g., seating, bumper beams, skid plates, load floors, pickup truck cargo boxes, and bedliners), interior automotive components (e.g., cosmetic panels), construction articles, consumer articles (e.g., sporting goods and appliances), and medical articles and components.

SUMMARY

In another embodiment, a rigid thermoplastic polymeric sheet material forming process is disclosed. The process includes heating, while under a heating vacuum range, a rigid thermoplastic polymeric sheet in a heating zone to a forming temperature to form a heated rigid thermoplastic polymeric sheet material. The process further includes transferring, while under a feeding vacuum range, the heated rigid thermoplastic polymeric sheet material from the heating zone to feed the heated rigid thermoplastic polymeric sheet material into a forming zone under the feeding vacuum range. The process also includes forming, in the forming zone, the heated rigid thermoplastic sheet material into a formed article.

In yet another embodiment, a heated polymeric sheet material forming process is disclosed. The process includes heating, while under a vacuum range, a polymeric sheet in a heating zone within a single chamber including a forming zone to a forming temperature to form a heated polymeric sheet material. The process also includes transferring, while under the vacuum range, the heated polymeric sheet material from the heating zone to feed the heated polymeric sheet material into the forming zone under the vacuum range. The process also includes forming, in the forming zone, the heated polymeric sheet material into a formed article.

DETAILED DESCRIPTION

Figure 1:
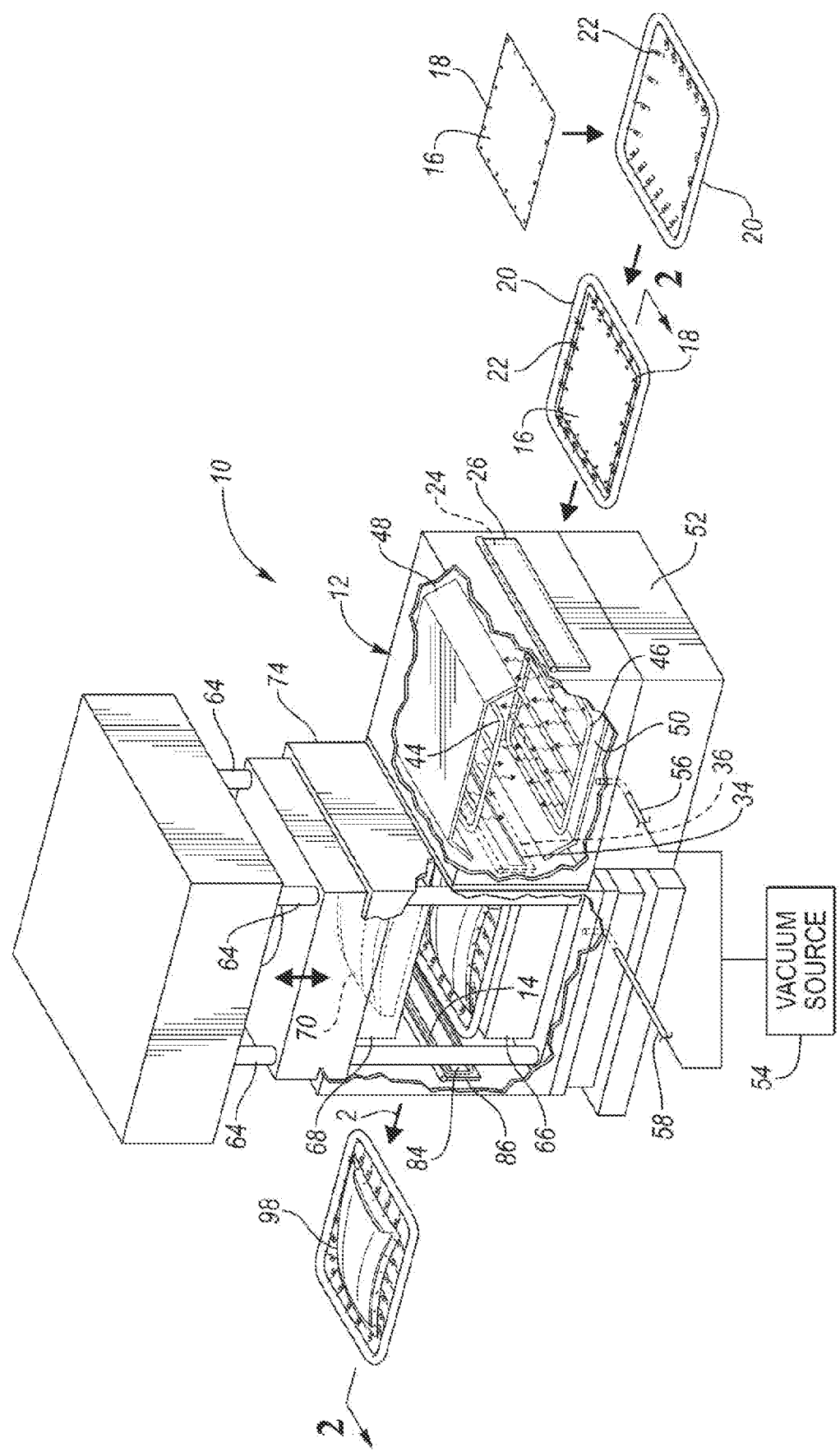
FIG. 1 is a cut away, perspective view of a first system configured to implement a heated polymeric sheet material feeding process according to a first embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "about" may be used herein to describe disclosed or claimed embodiments. The term "about" may modify a value disclosed or claimed in the present disclosure. In such instances, "about" may signify that the value it modifies is within +0%, 0.1%, 0.5%, 1%, 2%, 3%, 4%, 5% or 10% of the value.

Polymeric materials may be formed into articles. Polymeric materials may be formed of thermoplastic materials or thermoset materials. The polymeric material may be a polymer matrix composite including reinforcing fibers. Non-limiting examples of articles that can be formed from polymeric materials include cosmetic, exterior automotive components (e.g., hoods, fenders, decklids, roofs, bumpers, and fascia), structural automotive components (e.g., seating, bumper beams, skid plates, load floors, pickup truck cargo boxes, and bedliners), interior automotive components (e.g., cosmetic panels), construction articles, consumer articles (e.g., sporting goods and appliances), and medical articles and components.

Polymeric materials may be formed into polymeric sheet materials before being shaped into articles. The polymeric sheet material may be heated prior to being subjected to a shaping process. As non-limiting examples, the shaping process may be a compression molding process, a thermoforming process or a closed-mold process. Non-limiting examples of thermoforming processes including vacuum forming processes, pressure forming processes, plug-assist forming processes and matched die forming processes. Examples of closed mold processes include injection molding processes, compression molding processes and resin transfer molding (RTM) processes.

Several issues exist with existing processes for shaping polymeric sheet materials into articles. As mentioned above, the polymeric sheet material may be heated prior to the shaping process. The heating of certain polymeric sheet materials to an adequate forming temperature under otherwise ambient conditions may subject the polymeric sheet material to oxidation or other forms of degradation. The heated polymeric sheet material may be transferred from an oven to a mold under ambient conditions including air. Exposure to these ambient conditions and air over time can cause a significant decrease in the surface temperature of the heated polymeric sheet material, thereby potentially causing forming and/or cosmetic issues. The polymeric sheet material may be a semi-crystalline thermoplastic polymeric sheet material. The surface of this type of polymeric sheet material may crystallize during transfer of the polymeric sheet material, thereby potentially causing forming and/or cosmetic defects. The polymeric sheet material may be a hydroscopic polymeric sheet material. Insufficient drying of this type of polymeric sheet material before or during the heating process may cause degradation through hydrolysis or formation of bubbles within the polymeric sheet material. As another drawback of current proposals, shaping of a polymeric sheet material using a matched die set or other pressure based shaping process can entrap air, thereby creating a potential for forming and/or cosmetic defects.

Considering the foregoing, what is needed is a heated polymeric sheet material feeding process that overcomes one or more of the flaws identified above with respect to existing processes. Fulfilling such a need may expand the use of polymeric sheet materials to form shaped articles. In one or more embodiments, a heated polymeric sheet material feeding process is disclosed where a heated polymeric sheet material is transferred, while under a feeding vacuum range, from a heating chamber to feed the heated polymeric sheet material into a molding cavity. Following this process may reduce and/or eliminate one or more of the flaws associated with traditional processes, such as those processes where a heated polymeric sheet material is transferred and fed under ambient conditions including air.

In one or more embodiments, a heated polymeric sheet material feeding process is disclosed. The heated polymeric sheet material feeding process may include the step of heating a polymeric sheet material in a heating chamber to a forming temperature to form a heated polymeric sheet material. The heating chamber may be an insulated heating chamber or a non-insulated heating chamber. The heating chamber may use convective heat, conductive heat (e.g., conductive heat generated from an isobaric double belt press), electromagnetic heat, and/or radiant heat (e.g., infrared radiant heat). When using convective heat, the heating chamber may circulate gas (e.g., air in an ambient atmosphere or one or more inert gases in an inert atmosphere) inside the heating chamber to form a heating atmosphere. An inert gas may be a gas that does not chemically interact or react with a polymeric sheet material at a range of forming temperatures. Non-limiting examples include nitrogen, helium, argon, and combination thereof. The heating chamber may be an oven.

The heated polymeric sheet material feeding process may further include the step of transferring, while under a feeding vacuum range, the heated polymeric sheet material from the heating chamber to feed the heated polymeric sheet material into a forming chamber. The feeding vacuum range may be from 0 torr to 760 torr. The feeding vacuum range may be an extremely high vacuum of less than $10^{-12}$ torr. The feeding vacuum range may be an ultra-high vacuum in a range of $10^{-9}$ torr to $10^{-12}$ torr. The feeding vacuum range may be a high vacuum in a range of $10^{-3}$ torr to $10^{-9}$ torr. The feeding vacuum range may be a medium vacuum in a range of 25 torr to $10^{-3}$ torr. The feeding vacuum range may be a low vacuum in a range of 760 torr to 25 torr. The feeding vacuum range may have a residual atmosphere. The residual atmosphere may be ambient or inert. The residual atmosphere may be intentionally reactive. The disclosed feeding vacuum ranges and conditions may also be used for the heating vacuum range and conditions.

The heated polymeric sheet material feeding process may further include the step of shaping, in a forming chamber, the heated polymeric sheet material into a shaped article. The shaping step may be carried out using a compression molding process, a thermoforming process or a closed-mold process. Non-limiting examples of thermoforming processes including vacuum forming processes, pressure forming processes, plug assist forming processes and matched die forming processes. Non-limiting examples of closed-mold processes include injection molding processes, compression molding processes, and resin transfer molding (RTM) processes.

In one or more embodiments, a polymeric sheet material is a sheet formed of a polymeric material. In one or more embodiments, the sheet has first and second surfaces extending in the x and y directions in a generally planar manner to form a generally uniform thickness therebetween. The generally uniform thickness may deviate based on the generally planar first and second surfaces. The thickness of the "generally uniform thickness" may be any of the following thicknesses or in a range of any two of the following thicknesses: 0.25, 0.5, 0.75, 1, 1.5, 2, 4, 6, 8, 10, 12, 14, 16, 18, 20, 22, 24, 25.4, 30, 35, 40, 45, 50, and 50.4 mm. Non-limiting examples of polymeric sheet materials and formats may include tape-based laminate sheets ranging from 0.25 mm to 25 mm+/−10%, organosheets ranging from 0.25 mm to 25 mm+/−10%, glass mat thermoplastic (GMT) sheets ranging from 0.25 mm to 25 mm, extrudates of molding compounds such as LFT-D having a generally constant but highly variable cross-section, and combination thereof which when combined may have a range of constant or variable thicknesses or profiles (e.g., rectangular, circular, and irregular). In other embodiments, the thickness of the polymeric sheet materials may vary along the x and/or y directions of the polymeric material, for instance, when multiple formats are combined.

In one or more embodiments, the polymeric sheet material may be a polymeric thermoset sheet material or a polymeric thermoplastic sheet material. The categorization of the polymeric sheet material as thermoset or thermoplastic may be based on the type of resin used in the polymeric sheet material. Thermoset resins may comprise monomers, prepolymers or other polymeric materials in which a chemical reaction creates long polymer chains through a polymerization reaction resulting in a cured, plastic material that cannot be re-melted. The chemical reaction may be accelerated by heat and/or one or more catalysts. Prepreg materials are an intermediate product including reinforcing fibers combined with a thermoset resin. Thermoset sheets may include one or more plies of the same or different prepreg materials. Such thermoset sheets may be formable at room temperature. Alternatively, the thermoset sheets may be too rigid to form at room temperature and heat may need to be added to soften the thermoset resin to facilitate acceptable forming behavior before polymerization.

Thermoplastic resins may include thermoplastic resins used to form rigid thermoplastic sheet materials. Rigid thermoplastic sheet materials may soften when heated to allow them to be formed into articles by various processes but remain relatively rigid at service temperatures. Thermoplastic resins may include thermoplastic elastomers used to form thermoplastic sheet materials. Thermoplastic elastomers may be formed at elevated temperatures but remain flexible at service temperatures (e.g., ambient temperature). Once formed under a softened state, rigid thermoplastic sheet materials can be cooled and become rigid to set the shape of an article. This cycle may be repeatable, and in some instances, infinitely repeatable. Thermoplastic resins may be used in a pure form, otherwise referred to as a neat form. Alternatively, thermoplastic resins may be combined (e.g., compounded) with one or more fillers, one or more additives, and/or one or more other thermoplastic resins to form blends or alloys. Reinforcing materials (e.g., reinforcing fibers) may be added to thermoplastic resins to create a composite material. These modifications may improve the cost, processability, and/or functionality of the resulting thermoplastic material.

Polymeric thermoplastic materials may be used in different formats. Pellets or granules may be used for relatively short length reinforcing fibers (e.g., less than 1 mm or 2 mm long) because of their processing flexibility due to their flowability. Many pellet-based processes start from an extruder into which the pellets are dosed and heated. The molten compound may then be fed to a die under pressure in a profile extrusion or injection molding process where the compound is cooled and set to a desired shape.

In one or more embodiments, polymeric thermoplastic materials may also be used in a sheet format. A sheet format may have one or more advantages over a pellet format. A sheet may include multiple layers of thinner plies. Each ply may be individually tailored to a set of criteria such as a pre-consolidated composite structure. A sheet format may also be configured to form large, thin parts at lower cost and with better dimensional control. Knit lines where multiple flow fronts combine may avoid the use of injection molding processes when using a sheet format. Using a sheet format with such knit lines can often strengthen a part when composite materials are used as the reinforcing materials bridge the knit line.

In one or more embodiments, compression molding is a process where one or more sheets of heated polymeric thermoplastic material are transferred from a heating chamber into an open matched die set and the matched die set is closed under pressure forcing the polymeric thermoplastic sheet material to conform to both sides of the die. In one or more embodiments, the sheets of material fit within the perimeter of a mold and the pressure from the mold causes the thermoplastic sheet material to flow to fill the intended geometry. The thermoplastic material is then cooled in the mold to set the shape and subsequently demolded. Compression molding may also be utilized for thermoset materials where the thermoset sheet material enters a heated die at temperatures typically below the die temperature and undergo a chemical reaction to polymerize the resin initiated by the heat from the die.

In one or more embodiments, thermoforming may be used to shape polymeric thermoplastic sheet materials. In one embodiment, a thermoplastic sheet is held in a tensioning device (e.g., a tensioning frame, a clamp or a transfer frame) configured to secure a perimeter of the polymeric thermoplastic sheet material. While in the tensioning device, the polymeric thermoplastic sheet material is heated to a forming temperature, placed in proximity to a mold, and pressure is applied by a pressure source to force the polymeric thermoplastic sheet material into contact with a die surface.

In one or more embodiments, the thermoforming process may be a vacuum forming process. A vacuum forming process may be a process where a vacuum is drawn through a die against the inside of the heated polymeric thermoplastic sheet material creating a pressure differential with the outside of the sheet, which is exposed to a higher pressure. This pressure differential draws the sheet against the die surface. Pressure forming is a process where pressure is applied from outside the die against the heated sheet forcing the sheet to conform to the die surface.

In one or more embodiments, the thermoforming process may be a plug assist thermoforming process. The plug assist thermoforming process may utilize a mechanical plug in contact with a polymeric thermoplastic sheet material to help maneuver the sheet into position in combination with vacuum or pressure forming. Matched die forming is a process where two die halves are brought together under pressure onto the heated polymeric thermoplastic sheet material, thereby forcing the material to conform to the geometry of each side. Using this process, the sheet material is typically larger than the perimeter of the die geometry to be formed and excess material is later removed.

Thermoforming may also be applied to thermoset materials to create a preform where a resin undergoes softening at an elevated temperature like thermoplastic materials, but polymerization remains incomplete. The preform may be trimmed and stored for further processing. Subsequent curing of the preform completes the polymerization of the resin. In another configuration, preforming and polymerization can happen concurrently within a die.

Closed mold processes, such as injection molding processes, compression molding processes, and resin transfer molding (RTM) processes, may apply a vacuum at the die to minimize or prevent air entrapment from blocking the flow of resin, thereby enhancing the quality of a molded part made by the closed mold process. The air entrapment may cause defects in the molded part. Entrapped air may also combust with vapors released from the thermoplastic sheet material as material flow concentrates the vapors under heat and pressure. This process may be referred to as dieseling. Dieseling may cause cosmetic defects and/or excessive wear on a die. This drawback may be avoided or minimized by the step of one or more embodiments to transfer, while under a feeding vacuum range, the heated polymeric sheet material from the heating chamber to feed the heated polymeric sheet material into a molding cavity.

In the case of compression molding processes, a polymeric sheet material may be placed in a die in a bulk format of a sheet, and the polymeric sheet material may enter the die under ambient conditions and upper and lower die halves may be brought together vertically to apply pressure to form an article. In the case of a vacuum being applied, a seal is engaged as the upper and lower die halves are brought together to form a vacuum within the die. The polymeric sheet material is placed and held on the lower die half before the formation of a vacuum. This process takes time as does engaging the seal and generating the vacuum. The initial contact of the lower die half may cause surface defects due to air entrapment between the polymeric material and the surface of the lower die half unless the heated polymeric sheet material is transferred under a feeding vacuum range from the heating chamber to feed the heated polymeric sheet material into a molding cavity.

The step of transferring the heated polymeric sheet material under a feeding vacuum range from the heating chamber to feed the heated polymeric sheet material into a forming chamber may reduce or eliminate flaws associated with pre-cure. Pre-cure occurs when a thermoset material begins to cure before the die has completely formed the part, or premature cooling or crystallization of a polymeric thermoplastic sheet material before the die has completely formed the part. Pre-cure may also be caused by excessive time the polymeric thermoplastic sheet material is in contact with the die as the vacuum seal is engaged and vacuum is being built. The die may be oriented so that the side of the part with higher cosmetic requirements is located on top to delay contact with the polymeric material until the application of forming pressure has initiated. The negative effects of this delay may be mitigated by transferring, while under a feeding vacuum range, the heated polymeric sheet material from the heating chamber to feed the heated polymeric sheet material into a molding cavity.

Figure 2:
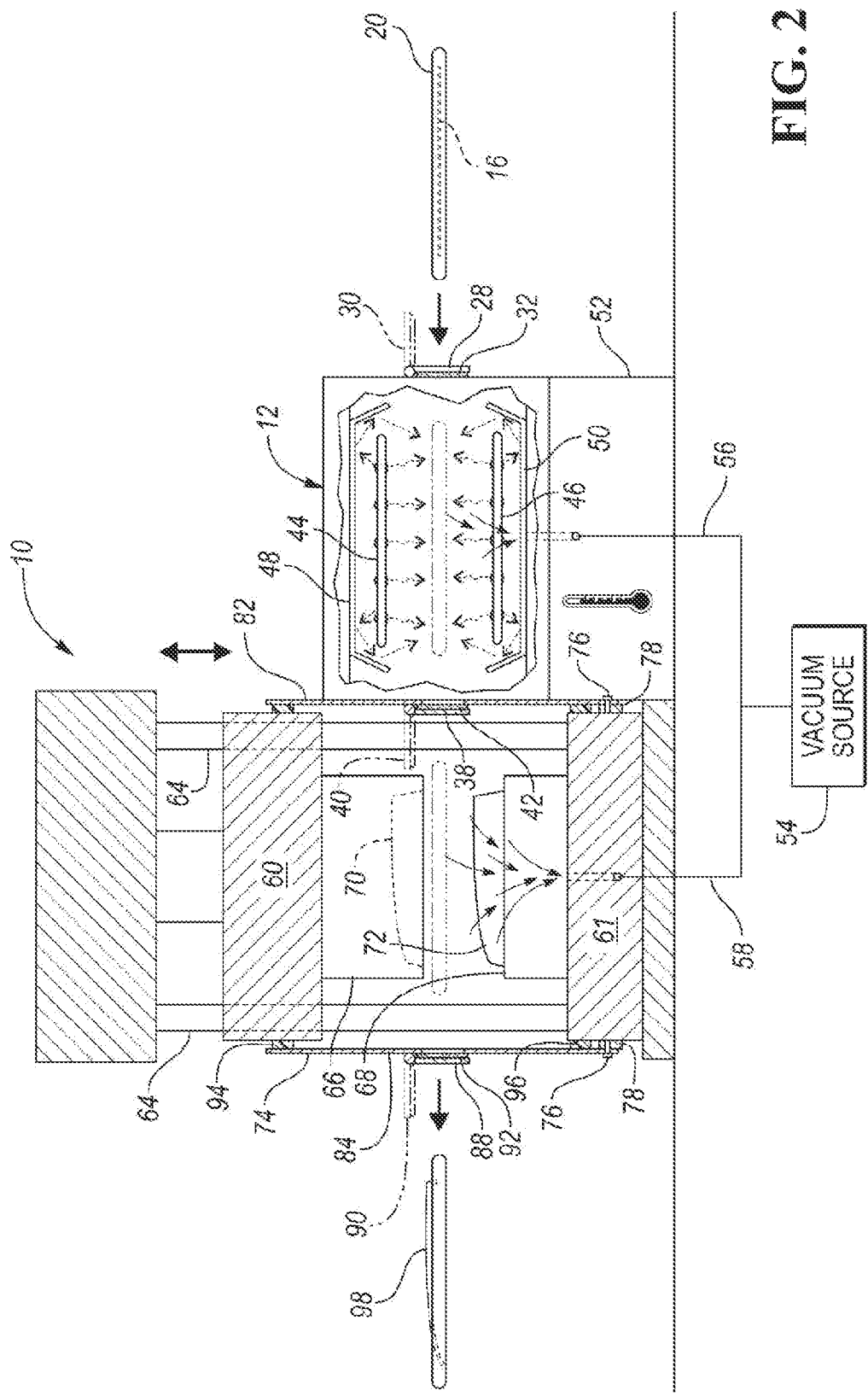
FIG. 2 is a cut away, side view and a partial cross-sectional view of the first system shown in FIG. 1 taken along line 2-2 of FIG. 1.

FIG. 1 is a cut away, perspective view of system 10 configured to implement a heated polymeric sheet material feeding process according to a first embodiment. FIG. 2 is a partial, cut away, side view and a partial cross-sectional view of system 10 shown in FIG. 1 taken along line 2-2 of FIG. 1. System 10 includes heating chamber 12 and forming chamber 14. Heating chamber 12 is configured to elevate the temperature of a polymeric sheet material to form a heated polymeric sheet material. Forming chamber 14 is configured to form a shaped article from the heated polymeric sheet material. The shaped article may be a three-dimensional article that substantially extends in three directions (i.e., x-axis, y-axis, and z-axis).

Polymeric sheet material 16 may be a thermoplastic polymeric sheet material or a thermoset polymeric sheet material. Polymeric sheet material 16 may be formed of a rigid polymeric sheet material. Polymeric sheet material 16 may be tape-based laminates, organosheets, and a glass mat thermoplastic (GMTex) (e.g., textiles and prepregs). Polymeric sheet material 16 includes an upper surface, a lower surface and a bulk thickness extending therebetween. Polymeric sheet material 16 includes apertures 18 situated around the periphery of polymeric sheet material 16. Apertures 18 extend through the bulk thickness of polymeric sheet material 16 and terminate at the upper and lower surfaces of apertures 18.

As shown in FIGS. 1 and 2, polymeric sheet material 16 is placed in tensioning frame 20. Springs 22 are attached on one end to the inner perimeter of tensioning frame 20. Tensioning frame 20 may be rigid and retain its original shape throughout the heating and forming process forcing polymeric sheet material 16 to stretch as it conforms to the shape of the forming process. The free ends of springs 22 are configured to interface with apertures 18 to couple polymeric sheet material 16 to tensioning frame 20. Springs 22 are configured to pre-tension polymeric sheet material 16 to allow tension to be maintained as polymeric sheet material 16 is drawn through system 10. Other tensioning devices may be utilized depending on the implementation. Non-limiting examples of other tensioning devices include flexible elements such as actuators. The tensioning device may be configured to apply tension to polymeric sheet material 16 while also allowing the perimeter of polymeric sheet material 16 to draw inward or in other directions during the forming process. Tensioning frame 20 may be formed from a rigid material such that tensioning frame retains its original shape as it is drawn through system 10, thereby forcing polymeric sheet material 16 to conform to the shape of a shaped article. Tensioning frame 20 including polymeric sheet material 16 is conveyed along a conveyor (not shown) into heating chamber 12.

Tensioning frame 20 including polymeric sheet material 16 is conveyed into heating chamber 12 through inlet port 24. Inlet port enclosure 26 is rotatably secured (e.g., using a hinge) to heating chamber 12 above inlet port 24 such that inlet port enclosure 26 is configured to rotate between closed position 28 and open position 30. Inlet port enclosure 26 rotates outwardly away from heating chamber 12 from closed position 28 to open position 30. Tensioning frame 20 including polymeric sheet material 16 is conveyed into heating chamber 12 through inlet port 24 when inlet port enclosure 26 is in open position 30. As shown in FIGS. 1 and 2, inlet seal 32 is secured to the back side of inlet port enclosure 26. Inlet seal 32 is configured to form a seal between inlet port enclosure 26 and heating chamber 12 such that gasses do not communicate into or out of heating chamber 12 through inlet port 24. As shown in FIGS. 1 and 2, inlet seal 32 is generally rectangular in a shape that follows the perimeter of inlet port enclosure 26 and is open in a central portion of inlet port enclosure 26. In another embodiment, the inlet seal may be the size of inlet port enclosure 26, thereby covering the entire back side of inlet port enclosure 26. In another embodiment, the inlet seal may be secured to heating chamber 12 around the outside perimeter of inlet port 24, instead of or in addition to a seal secured to the back side of inlet port enclosure 26. Inlet seal 32 may be formed from an elastomeric material, such as a rubber material.

Heating chamber 12 also includes outlet port 34 opposite inlet port 24. Outlet port enclosure 36 is rotatably secured (e.g., using a hinge) to heating chamber 12 about outlet port 34 such that outlet port enclosure 36 is configured to rotate between closed position 38 and open position 40. Outlet port enclosure 36 rotates outwardly away from heating chamber 12 from closed position 38 to open position 40. As shown in FIG. 2, outlet seal 42 is secured to the back side of outlet port enclosure 36. Outlet seal 42 is configured to form a seal between outlet port enclosure 36 and heating chamber 12 such that gasses do not communicate into or out of heating chamber 12 through outlet port 34. Outlet seal 42 is generally rectangular in a shape that follows the perimeter of outlet port enclosure 36 and is open in a central portion of outlet port enclosure 36. In another embodiment, the outlet seal may be the size of outlet port enclosure 36, thereby covering the entire back side of outlet port enclosure 36. In another embodiment, the outlet seal may be secured to heating chamber 12 around the outside perimeter of outlet port 34, instead of or in addition to a seal secured to the back side of outlet port enclosure 36. Outlet seal 42 may be formed from an elastomeric material, such as a rubber material.

As shown in FIGS. 1 and 2, single heating chamber 12 is shown. In other embodiments, two or more heating chambers may be utilized in a system to implement a heated polymeric sheet material feeding process. After tensioning frame 20 including polymeric sheet material 16 is conveyed into heating chamber 12 through inlet port 24 when inlet port enclosure 26 is in open position 30, inlet port enclosure 26 and outlet port enclosure 36 seals inlet port 24 and outlet port 34, respectively, against inlet seal 32 and outlet seal 42, respectively, to form a sealed environment in heating chamber 12 suitable for heating vacuum conditions within heating chamber 12.

Heating chamber 12 includes upper and lower heating elements 44 and 46 and upper and lower heating shields 48 and 50. Upper heating shield 48 is situated between upper heating element 44 and the upper wall of heating chamber 12. Lower heating shield 50 is situated between lower heating element 46 and base 52. Upper and lower heating elements 44 and 46 may be infrared heating elements. In one or more embodiments, heating chamber 12 may use one or more of the following heating methods: forced convection, conduction and infrared. Upper and lower heating elements 44 and 46 heat polymeric sheet material 16 to a forming temperature to form a heated polymeric sheet material. Non-limiting examples of forming temperatures may be any of the following temperatures or in a range of any two of the following temperatures: 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, and 400° C. The lower end of the range may be suitable for forming prepregs into preforms, and the higher end of the range may be suitable to form higher temperature resins such as liquid crystal polymers. In one embodiment, infrared heat is applied initially to dry polymeric sheet material 16 to remove moisture from polymeric sheet material 16. Once polymeric sheet material 16 is dried, heating of polymeric sheet material 16 may be continued until the desired forming temperature is reached.

In one embodiment, a vacuum may be applied within heating chamber 12 before heating polymeric sheet material 16. In other embodiments, once the forming temperature is reached, a vacuum may be applied within heating chamber 12 and forming chamber 14. The heated polymeric sheet material may also be transferred from heating chamber 12 to forming chamber 14 under vacuum conditions. Vacuum source 54 is communication with heating chamber 12 through heating chamber conduit 56. Vacuum source 54 is also in communication with forming chamber 14 through forming chamber conduit 58. Vacuum source 54 is configured to create vacuum conditions within heating chamber 12 and forming chamber 14. By maintaining vacuum conditions within heating chamber 12 and forming chamber 14 and while transferring the heated polymeric sheet material therebetween, the amount of heat lost by the heated polymeric sheet material is reduced or eliminated.

Forming chamber 14 includes upper platen 60 and lower platen 61. Forming chamber 14 includes upright members 64. Forming chamber 14 also includes upper and lower die halves 66 and 68 situated between upper and lower platens 60 and 61. Upper die half 66 has negative contour 70 and lower die half 68 has positive contour 72. Shroud 74 encloses the sides of forming chamber 14. Shroud 74 may be rectangular shaped to enclose forming chamber 14 on all four sides. Shroud 74 is fixed to lower die half 68 through fasteners 76 and brackets 78 as shown in FIG. 2. Shroud 74 may also be fixed to heating chamber 12. Shroud 74 includes inlet panel 80 and outlet panel 82. Upper die half 66 translates up and down inside of shroud 74.

Forming chamber 14 includes outlet port 84 opposite outlet port 34 of heating chamber 12. Outlet port 84 is formed on outlet panel 82. Outlet port enclosure 86 is rotatably secured (e.g., using a hinge) to forming chamber 14 about outlet port 84 such that outlet port enclosure 86 can rotate between closed position 88 and open position 90. As shown in FIG. 2, outlet seal 92 is secured to the back side of outlet port enclosure 86. Outlet seal 92 is configured to form a seal between outlet port enclosure 86 and forming chamber 14 such that gasses do not communicate into or out of forming chamber 14 through outlet port 84. Outlet seal 92 is generally rectangular in a shape that follows the perimeter of outlet port enclosure 86 and is open in a central portion of outlet port enclosure 86. In another embodiment, the outlet seal may be the size of outlet port enclosure 86, thereby covering the entire back side of outlet port enclosure 86. In another embodiment, the outlet seal may be secured to the outer surface of outlet panel 82 of shroud 74 around the outside perimeter of outlet port 84, instead of or in addition to a seal secured to the back side of outlet port enclosure 86. Outlet seal 92 may be formed from a rubber material.

Forming chamber 14 may include upper shroud seal 94 situated between upper die half 66 and shroud 74 and lower shroud seal 96 situated between lower die half 68 and shroud 74. Upper shroud seal 94 may be secured to upper die half 66 or the inner surface of shroud 74. In one or more embodiments, upper shroud seal 94 is not secured to both upper die half 66 and inner surface of shroud 74 because upper die half 66 moves up and down relative inner surface of shroud 74. The downward movement is limited so that a gap is not formed between upper die half 66 and shroud 74. Upper shroud seal 94 is configured to form a seal between shroud 74 and upper die half 66 such that gasses do not communicate into or out of forming chamber 14 through any gap between shroud 74 and upper die half 66. The sliding seal configuration of this embodiment and other embodiments disclosed herein may reduce the volume of forming chamber 14 or other former chambers disclosed herein. The reduced volume may decrease the time and money to create the transfer vacuum range in forming chamber 14 or other forming chambers as compared to a forming chamber without a sliding seal configuration. In one or more embodiments, upper shroud seal 94 forms a continuous rectangular perimeter following the profile of shroud 74. Lower shroud seal 96 may be secured to lower die half 68 and/or the inner surface of shroud 74. Lower shroud seal 96 is configured to form a seal between shroud 74 and lower die half 68 such that gasses do not communicate into or out of forming chamber 14 through any gap between shroud 74 and lower die half 68. In one or more embodiments, lower shroud seal 96 forms a continuous rectangular perimeter following the profile of shroud 74. Upper shroud seal 94, lower shroud seal 96, outlet seal 92 and outlet seal 42 cooperate to prevent gasses from coming into forming chamber 14 when a vacuum is being drawn inside forming chamber 14.

Once a vacuum within a heating vacuum range is formed in heating chamber 12 and within a feeding vacuum range in forming chamber 14, outlet port enclosure 36 is changed from closed position 38 to open position 40 and tensioning frame 20 including polymeric sheet material 16 is transferred from heating chamber 12 to forming chamber 14 while maintaining the heating vacuum range and the feeding vacuum range. The heating vacuum range and the feeding vacuum range may be the same range. In other embodiments, the heating vacuum range and the feeding vacuum range may be different. Once tensioning frame 20 including polymeric sheet material 16 is transferred from to forming chamber 14, outlet port enclosure 36 is changed from open position 40 to closed position 38 and outlet port enclosure 86 remains in closed position 88 so that the feeding vacuum range is maintained within forming chamber 14, and the vacuum is then released from heating chamber 12.

Under the feeding vacuum range, upper die half 66 is lowered so that upper die half 66 and lower die half 68 are closed onto polymeric sheet material 16 so that polymeric sheet material takes on the shape of negative contour 70 and positive contour 72. A pressure differential may be formed within forming chamber to form heated polymeric sheet material 16 under the pressure differential against upper die half 66 and/or lower die half 68. Polymeric sheet material 16 is held under pressure and compression as heat transfer occurs through upper and lower die halves 66 and 68 to facilitate cooling of polymeric sheet material 16 to set the shape of shaped article 98 and until a target demolding temperature is reached. In one embodiment, the vacuum in the feeding vacuum range is released once the target demolding temperature is reached. The vacuum in the feeding vacuum range may be released when both outlet port enclosures 36 and 68 are in closed positions 38 and 88, respectively, and sealed. The upper die half 66 is then raised and tensioning frame 20 is raised so that it clears lower die half 68. Outlet port enclosure 86 is then rotated from closed position 88 to open position 90 to facilitate transfer of shaped article 98 on a conveyor (not shown) within tensioning frame 20 from forming chamber 14 to outside of forming chamber 14. Once outside forming chamber 14, shaped article 98 is then removed from tensioning frame 20. Tensioning frame 20 may be reused with a new polymeric sheet material 16. Any excess material (not shown) around shaped article 98 may be trimmed away in a later processing step. The next tensioning frame 20 with polymeric sheet material may be loaded into heating chamber 12 once the current tensioning frame 20 is fed into forming chamber 14 under vacuum conditions.

Figure 3:
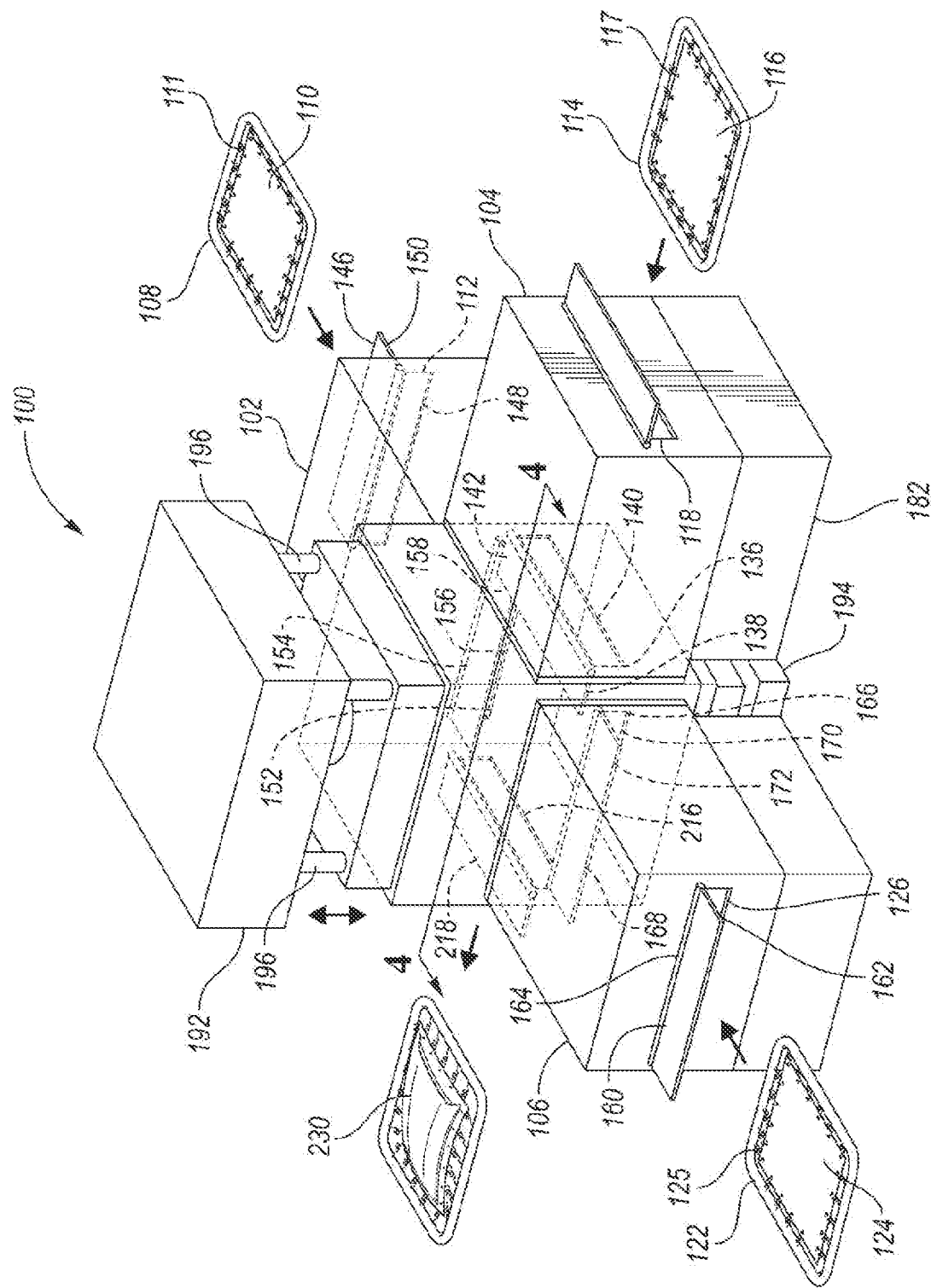
FIG. 3 is a perspective view of a second system configured to implement a heated polymeric sheet material feeding process according to a second embodiment.
Figure 4:
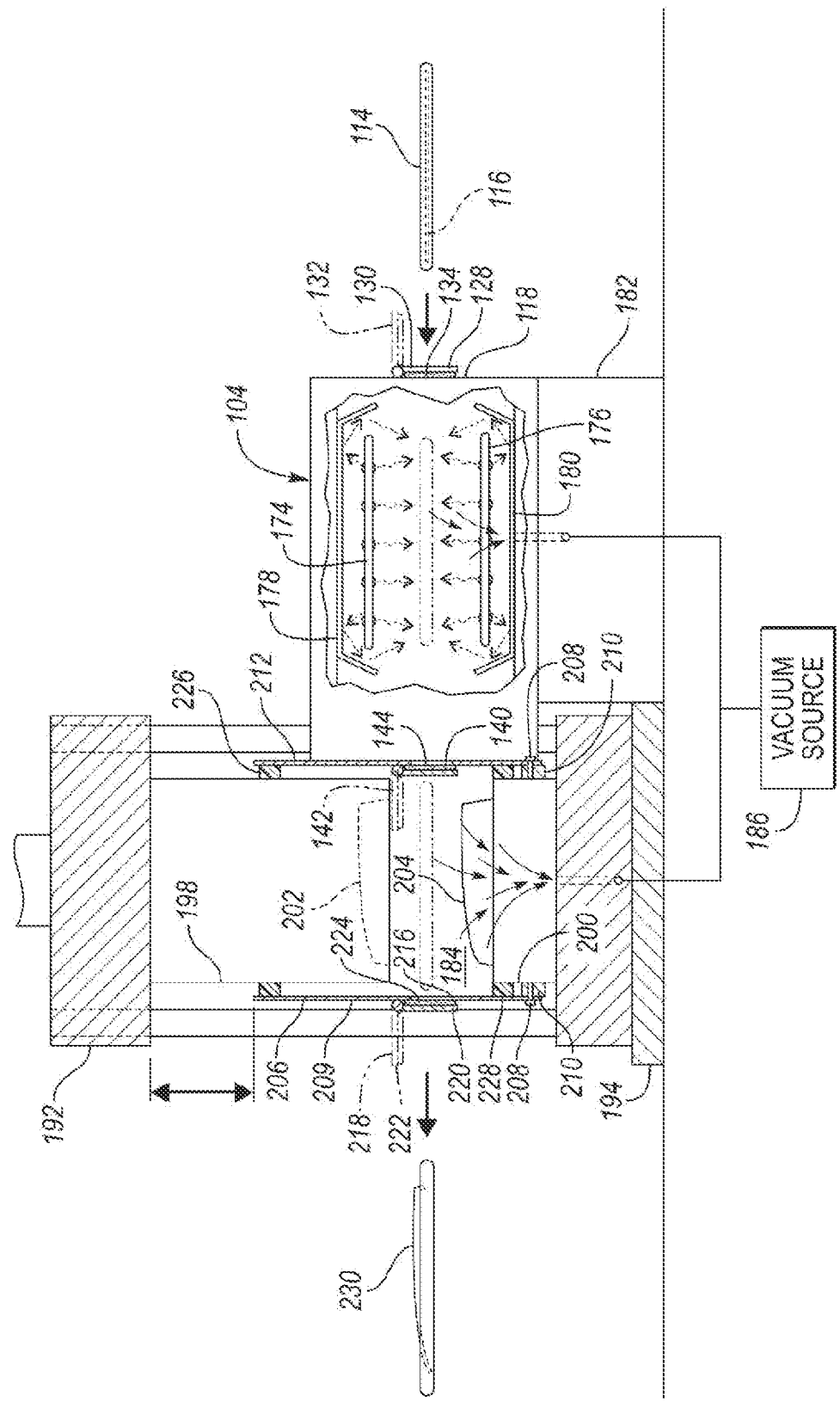
FIG. 4 is a cut away, side view and a partial cross-sectional view of the second system shown in FIG. 3 taken along line 4-4 of FIG. 3.

FIG. 3 is a perspective view of system 100 configured to implement a heated polymeric sheet material feeding process according to a second embodiment. FIG. 4 is a partial, cut away, side view and a partial cross-sectional view of system 100 taken along line 4-4 of FIG. 3. As shown in FIGS. 3 and/or 4, system 100 includes first heating chamber 102, second heating chamber 104 and third heating chamber 106. First heating chamber 102 is configured to receive first tensioning frame 108 tensioning first polymeric sheet material 110 through first inlet port 112 and conveyed along a conveyor (not shown). First tensioning frame 108 is configured to tension first polymeric sheet material 110 through springs 111 connected through first apertures 113 in first polymeric sheet material 110. Second heating chamber 104 is configured to receive second tensioning frame 114 tensioning second polymeric sheet material 116 through second inlet port 118 and conveyed along a second conveyor (not shown). Second tensioning frame 114 is configured to tension second polymeric sheet material 116 through second springs 117 connected through second apertures 119 in second polymeric sheet material 116. Third heating chamber 106 is configured to receive third tensioning frame 122 tensioning third polymeric sheet material 124 through third inlet port 126 and conveyed along a third conveyor (not shown). Third tensioning frame 122 is configured to tension third polymeric sheet material 124 through third springs 125 connected through third apertures 127 in third polymeric sheet material 124.

As shown in FIGS. 3 and 4, second inlet enclosure 128 is rotatably secured (e.g., using a hinge) to second heating chamber 104 above second inlet port 118 such that second inlet port enclosure 128 is configured to rotate between closed position 130 and open position 132. Second tensioning frame 114 including second polymeric sheet material 116 is conveyed into second heating chamber 104 through second inlet port 118 when second inlet port enclosure 128 is in open position 132. As shown in FIG. 4, second inlet seal 134 is secured to the back side of second inlet port enclosure 128. Second inlet seal 134 is configured to form a seal between second inlet portion enclosure 128 and second heating chamber 104 such that gasses do not communicate into or out of second heating chamber 104 through second inlet port 112. Second inlet seal 134 may be generally rectangular in a shape such that it follows the perimeter of second inlet port enclosure 128 and may be open in a central portion of second inlet port enclosure 128. In another embodiment, the second inlet seal may be the size of second inlet port enclosure 128 thereby covering the entire back side of second inlet port enclosure 128. In another embodiment, the second inlet seal may be secured to second heating chamber 104 around the outside perimeter of second inlet port 118, instead of or in addition to a seal secured to the back side of second inlet port enclosure 128. Second inlet seal 134 may be formed from an elastomeric material, such as a rubber material.

Second heating chamber 104 also includes second outlet port 136 opposite second inlet port 118. Second outlet port enclosure 138 is rotatably secured (e.g., using a hinge) to second heating chamber 104 about second outlet port 136 such that second outlet port enclosure 138 is configured to rotate between closed position 140 and open position 142. Second outlet port enclosure 138 rotates outwardly away from second heating chamber 104 from closed position 140 to open position 142. As shown in FIG. 4, second outlet seal 144 is secured to the back side of second outlet port enclosure 138. Second outlet seal 144 is configured to form a seal between second outlet port enclosure 138 and second heating chamber 104 such that gasses do not communicate into or out of second heating chamber 104 through second outlet port 136. Second outlet seal 144 is generally rectangular in a shape that follows the perimeter of second outlet port enclosure 138 and is open in a central portion of second outlet port enclosure 138. In another embodiment, the second outlet seal may be the size of second outlet port enclosure 138, thereby covering the entire back side of second outlet port enclosure 138. In another embodiment, the second outlet seal may be secured to second heating chamber 104 around the outside perimeter of second outlet port 136, instead of or in addition to a seal secured to the back side of second outlet port enclosure 138. Second outlet seal 144 may be formed from an elastomeric material, such as a rubber material.

As shown in FIG. 3, first inlet port enclosure 146 is rotatably secured (e.g., using a hinge) to first heating chamber 102 above first inlet port 112 such that first inlet port enclosure 146 is configured to rotate between closed position 148 and open position 150. First tensioning frame 108 including first polymeric sheet material 110 is conveyed into first heating chamber 102 through first inlet port 112 when first inlet port enclosure 146 is in open position 150. A first inlet seal (not shown) may be secured to the back side of first inlet port enclosure 146. The first inlet seal is configured to form a seal between first inlet port enclosure 146 and first heating chamber 102 such that gasses do not communicate into or out of first heating chamber 102 through first inlet port 112. The first inlet seal may be generally rectangular in a shape such that it follows the perimeter of first inlet port enclosure 146 and may be open in a central portion of first inlet port enclosure 146. In another embodiment, the first inlet seal may be the size of first inlet port enclosure 146 thereby covering the entire back side of first inlet port enclosure 146. In another embodiment, the first inlet seal may be secured to first heating chamber 102 around the outside perimeter of first inlet port 112, instead of or in addition to a seal secured to the back side of first inlet port enclosure 146. The first inlet seal may be formed from an elastomeric material, such as a rubber material.

First heating chamber 102 also includes first outlet port 152 opposite first inlet port 112. First outlet port enclosure 154 is rotatably secured (e.g., using a hinge) to first heating chamber 102 about first outlet port 152 such that first outlet port enclosure 154 is configured to rotate between closed position 156 and open position 158. First outlet port enclosure 154 rotates outwardly away from first heating chamber 102 from closed position 156 to open position 158. A first outlet seal (not shown) may be secured to the back side of first outlet port enclosure 154. The first outlet seal is configured to form a seal between first outlet port enclosure 154 and first heating chamber 102 such that gasses do not communicate into or out of first heating chamber 102 through first outlet port 152. The first outlet seal may be generally rectangular in a shape that follows the perimeter of first outlet port enclosure 154 and is open in a central portion of first outlet port enclosure 154. In another embodiment, the first outlet seal may be the size of first outlet port enclosure 154, thereby covering the entire back side of first outlet port enclosure 154. In another embodiment, the first outlet seal may be secured to first heating chamber 102 around the outside perimeter of first outlet port 152, instead of or in addition to a seal secured to the back side of first outlet port enclosure 154. The first outlet seal may be formed from an elastomeric material, such as a rubber material.

As shown in FIG. 3, third inlet port enclosure 160 is rotatably secured (e.g., using a hinge) to third heating chamber 106 above third inlet port 126 such that third inlet port enclosure 160 is configured to rotate between closed position 162 and open position 164. Third tensioning frame 122 including third polymeric sheet material 124 is conveyed into third heating chamber 106 through third inlet port 126 when third inlet port enclosure 160 is in open position 164. A third inlet seal (not shown) may be secured to the back side of third inlet port enclosure 160. The third inlet seal is configured to form a seal between third inlet port enclosure 160 and third heating chamber 106 such that gasses do not communicate into or out of third heating chamber 106 through third inlet port 126. The third inlet seal may be generally rectangular in a shape such that it follows the perimeter of third inlet port enclosure 160 and may be open in a central portion of third inlet port enclosure 160. In another embodiment, the third inlet seal may be the size of third inlet port enclosure 160 thereby covering the entire back side of third inlet port enclosure 160. In another embodiment, the third inlet seal may be secured to third heating chamber 106 around the outside perimeter of third inlet port 126, instead of or in addition to a seal secured to the back side of third inlet port enclosure 160. The third inlet seal may be formed from an elastomeric material, such as a rubber material.

Third heating chamber 106 also includes third outlet port 166 opposite third inlet port 126. Third outlet port enclosure 168 is rotatably secured (e.g., using a hinge) to third heating chamber 106 about third outlet port 166 such that third outlet port enclosure 168 is configured to rotate between closed position 170 and open position 172. Third outlet port enclosure 168 rotates outwardly away from third heating chamber 106 from closed position 170 to open position 172. A third outlet seal (not shown) may be secured to the back side of third outlet port enclosure 168. The third outlet seal is configured to form a seal between third outlet port enclosure 168 and third heating chamber 106 such that gasses do not communicate into or out of third heating chamber 106 through third outlet port 166. The third outlet seal may be generally rectangular in a shape that follows the perimeter of third outlet port enclosure 168 and is open in a central portion of third outlet port enclosure 168. In another embodiment, the third outlet seal may be the size of third outlet port enclosure 168, thereby covering the entire back side of third outlet port enclosure 168. In another embodiment, the third outlet seal may be secured to third heating chamber 106 around the outside perimeter of third outlet port 166, instead of or in addition to a seal secured to the back side of third outlet port enclosure 168. The first outlet seal may be formed from an elastomeric material, such as a rubber material.

As described above, system 100 includes first heating chamber 102, second heating chamber 104 and third heating chamber 106. Following is a description of the components and operation of second heating chamber 104 according to one embodiment as shown in FIGS. 3 and 4. This description may be applied to like components and operation of first heating chamber 102 and/or third heating chamber 106. As shown in FIGS. 3 and 4, after second tensioning frame 114 including second polymeric sheet material 116 is conveyed into second heating chamber 104 through second inlet port 118 when second inlet port enclosure 128 is in open position 132, second inlet port enclosure 132 and second outlet port enclosure 138 seals second inlet port 118 and second outlet port 136, respectively, against second inlet seal 134 and second outlet seal 144, respectively, to form a sealed environment in second heating chamber 104 suitable for heating vacuum conditions within second heating chamber 104.

As shown in FIG. 4, second heating chamber 104 includes second upper and lower heating elements 174 and 176 and second upper and lower heating shields 178 and 180. Second upper heating shield 178 is situated between second upper heating element 174 and the upper wall of second heating chamber 104. Second lower heating shield 180 is situated between second lower heating element 176 and second base 182. Second upper and lower heating elements 174 and 176 may be infrared heating elements. In one or more embodiments, second heating chamber 104 may use one or more of the following heating methods: convective heat, conductive heat (e.g., conductive heat generated from an isobaric double belt press), electromagnetic heat, and/or radiant heat (e.g., infrared radiant heat). Second upper and lower heating elements 174 and 176 heat second polymeric sheet material 116 to a forming temperature to form a heated polymeric sheet material. Non-limiting examples of forming temperatures may be any of the following temperatures or in a range of any two of the following temperatures: 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, and 400° C.

Once the forming temperature is reached, a vacuum may be applied within second heating chamber 104 and forming chamber 184. The heated polymeric sheet material may also be transferred under vacuum conditions. As shown in FIG. 4, vacuum source 186 is in communication with second heating chamber 104 through second heating chamber conduit 188. Vacuum source 186 is also in communication with forming chamber 184 through forming chamber conduit 190. Vacuum source 186 is configured to create vacuum conditions within second heating chamber 104 and forming chamber 184. By maintaining vacuum conditions within second heating chamber 104 and forming chamber 184 and while transferring the heated polymeric sheet material therebetween, the amount of heat lost by the heated polymeric sheet material is reduced or eliminated.

In one embodiment, system 100 is configured to sequentially heat first polymeric sheet material 110, second polymeric sheet material 116, and third polymeric sheet material 124, in first heating chamber 102, second heating chamber 104 and third heating chamber 106, respectively to obtain first, second and third heated polymeric sheet materials, respectively. The sequentially feeding steps of the three heating chamber configuration of FIGS. 3 and 4 may permit a greater throughput of shaped articles than a single heating chamber configuration, for example, when the forming time is less than the heating time. In one embodiment, first polymeric sheet material 110 is heated in a sealed first heating chamber 102 to a forming temperature to form the first heated polymeric sheet material. When the forming temperature is met, a vacuum condition is simultaneously formed in sealed first heating chamber 102 and sealed forming chamber 184. After the vacuum condition is created, the first heated polymeric sheet is transferred to forming chamber 184, which is configured to form, under the vacuum condition, the first heated polymeric sheet into a first shaped article, which then exits forming chamber 184.

As and/or before the first heated polymeric sheet is being formed into a first shaped article in forming chamber 184, second polymeric sheet material 116 may be heated in a sealed second heating chamber 104 and first heating chamber 102 may be being loaded with a new first polymeric sheet material 110. After the first shaped article exits forming chamber 184 and second polymeric sheet material 116 reaches a forming temperature, a vacuum condition may be simultaneously formed in second heating chamber 104 and forming chamber 184 using vacuum source 186. After the vacuum condition is created, the second heated polymeric sheet is transferred to forming chamber 184 to form, under the vacuum condition, the second heated polymeric sheet into a second shaped article, which then exits forming chamber 184.

As and/or before the second heated polymeric sheet is being formed into a second shaped article in forming chamber 184, third polymeric sheet material 124 may be heated in a sealed third heating chamber 106 and second heating chamber 104 may be loaded with a new second polymeric sheet material 116. After the second shaped article exits forming chamber 184 and third polymeric sheet material 124 reaches a forming temperature, a vacuum condition may be simultaneously formed in third heating chamber 106 and forming chamber 184 using vacuum source 186. After the vacuum condition is created, the third heated polymeric sheet is transferred to forming chamber 184 to form, under the vacuum condition, the third heated polymeric sheet into a third shaped article, which then exits forming chamber 184. In one embodiment, this sequential process of using system 100 is repeated.

Forming chamber 184 includes the upper platen 192 configured to move on upright members 198 and press bed 194. Forming chamber 184 also includes upper and lower die halves 198 and 200 situated between upper platen 192 and press bed 194. Upper die half 198 has negative contour 202 and lower die half 200 has positive contour 204. Shroud 206 encloses the sides of forming chamber 184. Shroud 206 may be rectangular shaped to enclose forming chamber 184 on all four sides. Shroud 206 is fixed to lower die half 200 through fasteners 208 and brackets 210 as shown in FIG. 4. Shroud 206 may also be fixed to one or more of first heating chamber 102, second heating camber 104 and third heating chamber 106. Shroud 206 includes inlet panel 212 and outlet panel 209. Upper die half 198 translates up and down inside of shroud 206.

Forming chamber 184 includes outlet port 216 opposite second outlet port 136 of second heating chamber 104. Outlet port 216 is formed on outlet panel 214. Outlet port enclosure 218 is rotatably secured (e.g., using a hinge) to forming chamber 184 about outlet port 216 such that outlet port enclosure 218 can rotate between closed position 220 and open position 222. As shown in FIG. 4, outlet seal 224 is secured to the back side of outlet port enclosure 218. Outlet seal 224 is configured to form a seal between outlet port enclosure 218 and forming chamber 184 such that gasses do not communicate into or out of forming chamber 184 through outlet port 216. Outlet seal 224 is generally rectangular in a shape that follows the perimeter of outlet port enclosure 218 and is open in a central portion of outlet port enclosure 218. In another embodiment, the outlet seal may be the size of outlet port enclosure 218, thereby covering the entire back side of outlet port enclosure 218. In another embodiment, the outlet seal may be secured to the outer surface of outlet panel 214 of shroud 206 around the outside perimeter of outlet port 216, instead of or in addition to a seal secured to the back side of outlet port enclosure 218. Outlet seal 224 may be formed from a rubber material.

Forming chamber 184 may include upper shroud seal 226 situated between upper die half 198 and shroud 206 and lower shroud seal 228 situated between lower die half 200 and shroud 206. Upper shroud seal 226 may secured to upper die half 198 or the inner surface of shroud 206. In one or more embodiments, upper shroud seal 226 is not secured to both upper die half 198 and inner surface of shroud 206 because upper die half 198 moves up and down relative inner surface of shroud 206. The downward movement is limited so that a gap is not formed between upper die half 198 and shroud 206. Upper shroud seal 226 is configured to form a seal between shroud 206 and upper die half 198 such that gasses do not communicate into or out of forming chamber 184 through any gap between shroud 206 and upper die half 198. In one or more embodiments, upper shroud seal 226 forms a continuous rectangular perimeter following the profile of shroud 206. Lower shroud seal 228 may be secured to lower die half 200 and/or the inner surface of shroud 206. Lower shroud seal 228 is configured to form a seal between shroud 206 and lower die half 200 such that gasses do not communicate into or out of forming chamber 184 through any gap between shroud 206 and lower die half 200. In one or more embodiments, lower shroud seal 228 forms a continuous rectangular perimeter following the profile of shroud 206. Upper shroud seal 226, lower shroud seal 228, outlet seal 224 and second outlet seal 144 cooperate to prevent gasses from coming into forming chamber 184 when a vacuum is being drawn inside forming chamber 184.

Once a vacuum within a heating vacuum range is formed in second heating chamber 104 (or other heating chamber as shown in FIG. 3) and within a feeding vacuum range in forming chamber 184, second outlet port enclosure 138 (or other outlet port enclosure as shown in FIG. 3) is changed from closed position 140 to open position 142 (or open and closed positions of other outlet port enclosure as shown in FIG. 3) and second tensioning frame 114 including second polymeric sheet material 116 (or other tensioning frame including a polymeric sheet material as shown in FIG. 3) is transferred from second heating chamber 104 (or other heating chamber as shown in FIG. 3) to forming chamber 184 while maintaining the heating vacuum range and the feeding vacuum range. The heating vacuum range and the feeding vacuum range may be the same range. In other embodiments, the heating vacuum range and the feeding vacuum range may be different. Once tensioning frame 114 including second polymeric sheet material 116 is transferred from to forming chamber 184, second outlet port enclosure 138 is changed from open position 142 to closed position 140 and outlet port enclosure 218 remains in closed position 220 so that the feeding vacuum range is maintained within forming chamber 184, and the vacuum is then released from third heating chamber 106.

Under the feeding vacuum range, upper die half 198 is lowered so that upper die half 198 and lower die half 200 is closed onto first, second, or third polymeric sheet material 110, 116, or 124 so that polymeric sheet material takes on the shape of negative contour 202 and positive contour 204. First, second or third polymeric sheet material 110, 116, or 124 is held under pressure and compression as heat transfer occurs through upper and lower die halves 198 and 200 to facilitate cooling of first, second, or third polymeric sheet material 110, 116 or 124 to set the shape of shaped article 230 and until a target demolding temperature is reached. In one embodiment, the vacuum in the feeding vacuum range is released once the target demolding temperature is reached. The vacuum in the feeding vacuum range may be released when both outlet port enclosures 138 and 218 are in closed positions 140 and 220, respectively, and sealed. The upper die half 198 is then raised and first, second or third tensioning frame 108, 114 or 122 is raised so that it clears lower die half 200. Outlet port enclosure 218 is then rotated from closed position 220 to open position 222 to facilitate transfer of shaped article 230 on a conveyor (not shown) within first, second or third tensioning frame 108, 114 or 122 from forming chamber 184 to outside of forming chamber 184. Once outside forming chamber 184, shaped article 230 is then removed from first, second or third tensioning frame 108, 114 or 122. Any excess material (not shown) around shaped article 230 may be trimmed away in a later processing step.

Figure 5:
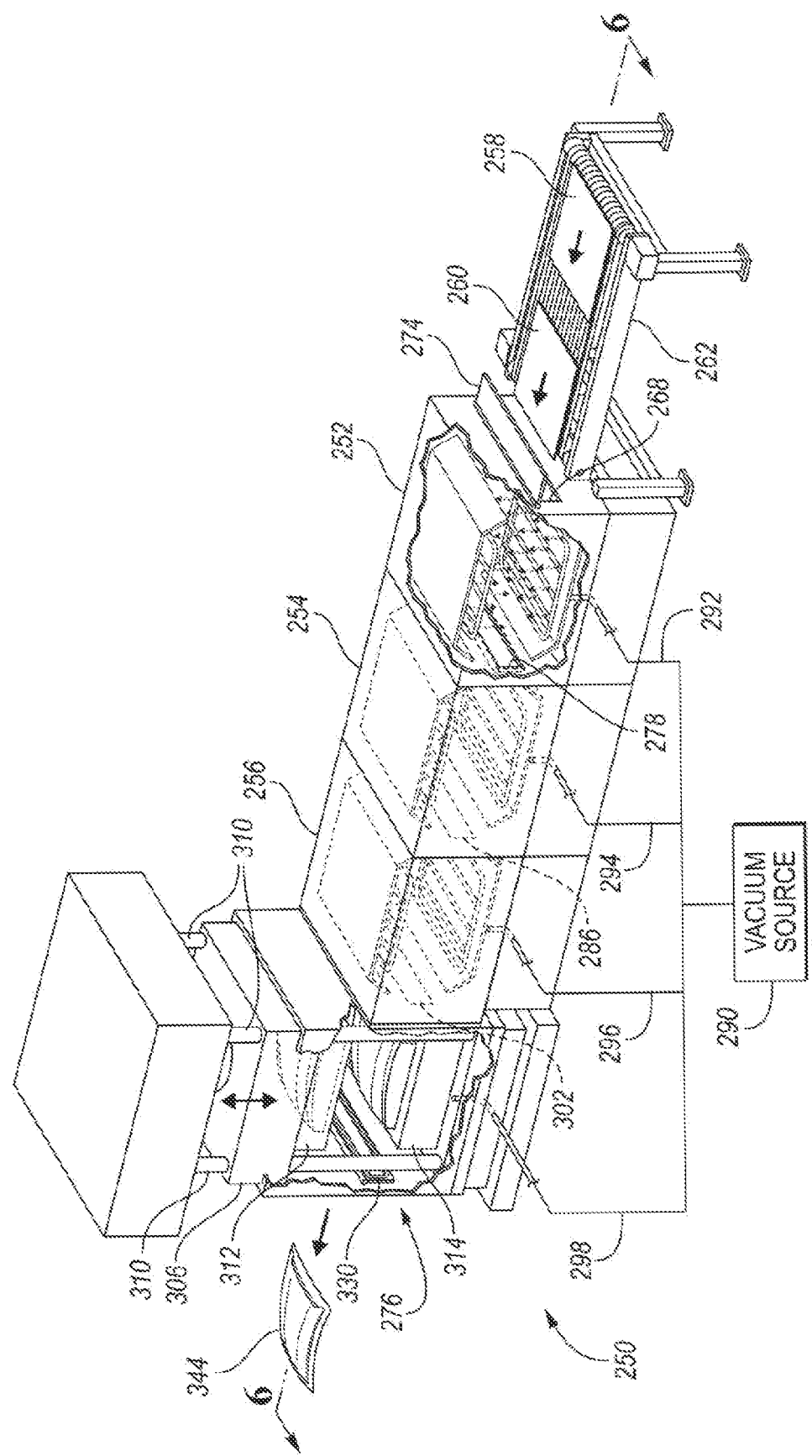
FIG. 5 is a cut away, perspective view of a third system configured to implement a heated polymeric sheet material feeding process according to a third embodiment.
Figure 6:
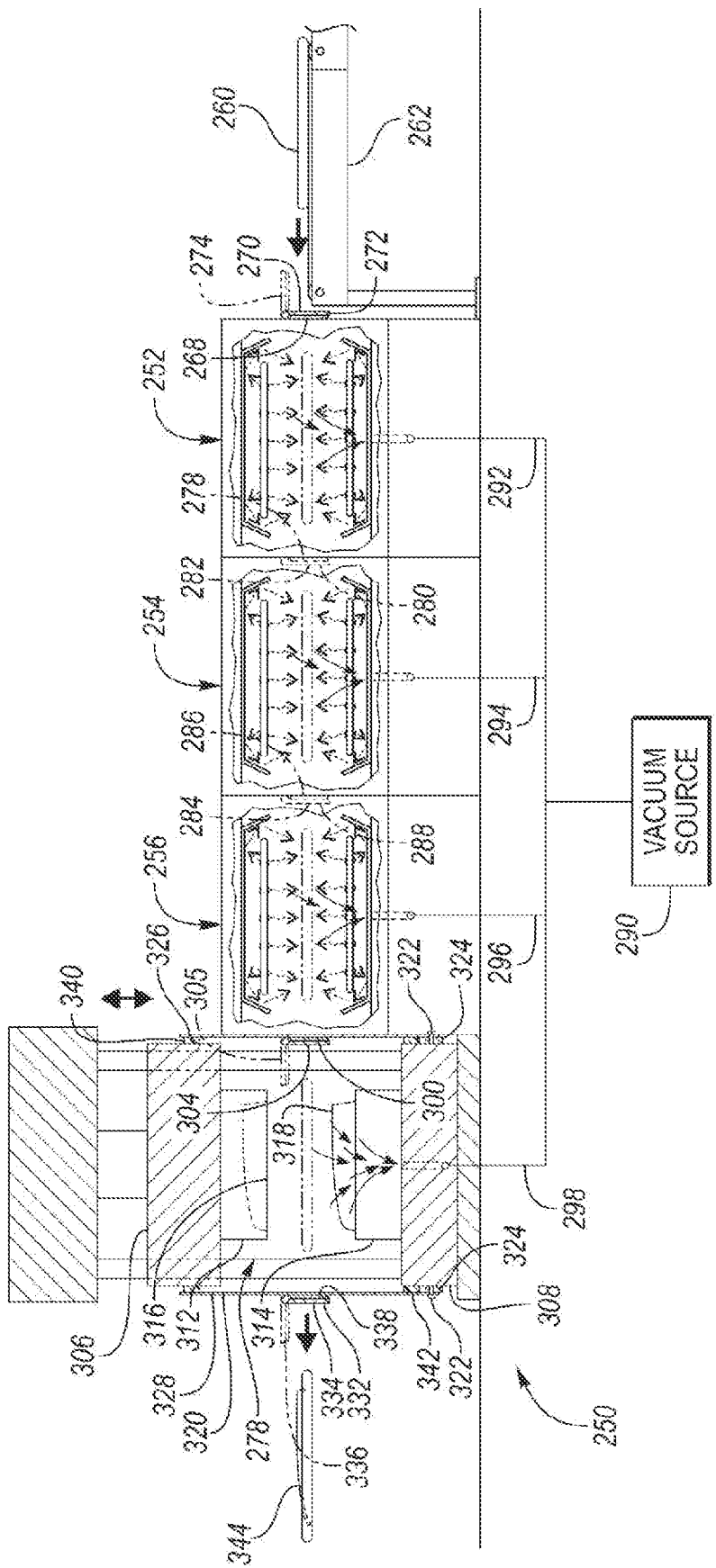
FIG. 6 is a cut away, side view and a partial cross-sectional view of a third system shown in FIG. 5 taken along line 6-6 of FIG. 5.

FIG. 5 is a cut away, perspective view of system 250. FIG. 6 is a partial, cut away, side view and a partial cross-sectional view of system 250 shown in FIG. 5 taken along line 6-6 of FIG. 5. System 250 includes first heating chamber 252, second heating chamber 254 and third heating chamber 256. First heating chamber 252 may be configured to act as a heating zone and/or an air lock. The structure and operation of first, second and third heating chambers 252, 254 and 256 may be the same as shown and depicted with respect to heating chamber 12. First, second, and third heating chambers 252, 254, and 256 are connected to each other such that a vacuum condition may be maintained individually in each heating chamber 252, 254, and 256, within adjacent heating chambers (e.g., heating chambers 252 and 254 or heating chamber 254 and 256) or in all three heating chambers. A benefit of the arrangement of first, second, and third heating chambers is the multiple zones achieve better throughput. For example, if the heating operation takes 3 minutes but the forming operation takes 1 minute, then 3 sequential heating zones offer 3 minutes of residence time and support a 1 minute forming time.

As shown in FIGS. 5 and 6, first and second polymeric sheet materials 258 and 260 are placed on conveyer 262. First and second polymeric sheet materials 258 and 260 may be formed of a flowable bulk material such as a GMT or sheet molding compound (SMC). First polymeric sheet material 258 may be placed in first heating chamber 252. Second polymeric sheet material 260 may be placed in second heating chamber 254. A third polymeric sheet material may be placed in third heating chamber 256. In this configuration, the three polymeric sheet materials may be heated to a forming temperature simultaneously. A vacuum may be applied to all three heating chambers 252, 254, and 256 after the forming temperature is reached.

Vacuum source 290 is in communication with first, second, and third heating chambers 252, 254, and 256 through first, second, and third vacuum conduits 292, 294, and 296, respectively. Vacuum source 290 is also in communication with forming chamber 276 through forming chamber conduit 298. Vacuum source 290 is configured to create vacuum conditions within first, second, and/or third heating chambers 252, 254, and/or 256, simultaneously, sequentially or at different times. By maintaining vacuum conditions within first heating chamber 252 and second heating chamber 254 and while transferring the heated polymeric sheet material therebetween, the amount of heat lost by the heated polymeric sheet is reduced or eliminated.

Once the forming temperature is reached and a vacuum condition is met, third heating chamber 256 may be opened to forming chamber 276 so that the third polymeric sheet material may be transferred under vacuum conditions from third heating chamber 256 to forming chamber 276 through forming chamber inlet port 302 when forming chamber inlet port enclosure 300 is in open position 305 and third inlet port enclosure 284 is in closed position 288. By maintaining vacuum conditions within third heating chamber 256 and forming chamber 276 and while transferring the heated polymeric sheet material therebetween, the amount of heat lost by the heated polymeric sheet may be reduced or eliminated.

Once the third polymeric sheet material is transferred into forming chamber 276, forming chamber inlet port enclosure 300 is changed to closed position 304 and third inlet port enclosure 284 is changed to an open position, while second inlet port enclosure 280 is maintained in closed position 282. In this configuration, second polymeric sheet material 260 may be transferred from second heating chamber 254 to third heating chamber 256 under vacuum conditions (and subsequently into forming chamber 276 under vacuum conditions). Once second polymeric sheet material 260 is transferred into third heating chamber 256, third inlet port enclosure 284 is changed to closed position 282, while inlet port enclosure 270 is maintained in closed position 272. In this configuration, first polymeric sheet material 258 may be transferred from first heating chamber 252 to second heating chamber 254 through second inlet port 278 under vacuum conditions (and subsequently into third heating chamber 256 and then forming chamber 276 under vacuum conditions). Once first polymeric sheet material 258 is transferred into second heating chamber 254, second inlet port enclosure 280 is changed to closed position 282 and inlet port enclosure 270 is changed to open position 274 so that a fourth polymeric sheet material may be placed in first heating chamber 252 through first inlet port 268 to repeat the sequence heating, applying a vacuum condition, and transferring heated polymeric sheet material under vacuum conditions.

Forming chamber 276 includes upper platen 306 and lower platen 308. Forming chamber 276 includes upright members 310. Forming chamber 276 also includes upper and lower die halves 312 and 314 situated between upper platen 306 and lower platen 308. Upper die half 312 has negative contour 316 and lower die half 314 has positive contour 318. Shroud 320 encloses the sides of forming chamber 276. Shroud 320 may be rectangular shaped to enclose forming chamber 276 on all four sides. Shroud 320 is fixed to lower die half 314 through fasteners 322 and brackets 324 as shown in FIG. 6. Shroud 320 may also be fixed to third heating chamber 256. Shroud 320 includes inlet panel 326 and outlet panel 328. Upper die half 312 translates up and down inside of shroud 320.

Forming chamber 276 includes outlet port 330 opposite forming chamber inlet port 302. Outlet port 330 is formed on outlet panel 328. Outlet port enclosure 332 is rotatably secured (e.g., using a hinge) to forming chamber 276 about outlet port 330 such that outlet port enclosure 332 can rotate between closed position 334 and open position 336. As shown in FIG. 6, outlet seal 338 is secured to the back side of outlet port enclosure 332. Outlet seal 338 is configured to form a seal between outlet port enclosure 332 and forming chamber 276 such that gasses do not communicate into or out of forming chamber 276 through outlet port 330. Outlet seal 338 is generally rectangular in a shape that follows the perimeter of outlet port enclosure 332 and is open in a central portion of outlet port enclosure 332. In another embodiment, the outlet seal may be the size of outlet port enclosure 332, thereby covering the entire back side of outlet port enclosure 332. In another embodiment, the outlet seal may be secured to the outer surface of outlet panel 328 of shroud 320 around the outside perimeter of outlet port 330, instead of or in addition to a seal secured to the back side of outlet port enclosure 332. Outlet seal 338 may be formed from a rubber material.

Forming chamber 276 may include upper shroud seal 340 situated between upper die half 312 and shroud 320 and lower shroud seal 342 situated between lower die half 314 and shroud 320. Upper shroud seal 340 may secured to upper die half 312 or the inner surface of shroud 320. In one or more embodiments, upper shroud seal 340 is not secured to both upper die half 312 and inner surface of shroud 320 because upper die half 312 moves up and down relative inner surface of shroud 320. The downward movement is limited so that a gap is not formed between upper die half 312 and shroud 320. Upper shroud seal 340 is configured to form a seal between shroud 320 and upper die half 312 such that gasses do not communicate into or out of forming chamber 276 through any gap between shroud 320 and upper die half 312. In one or more embodiments, upper shroud seal 340 forms a continuous rectangular perimeter following the profile of shroud 320. Lower shroud seal 342 may be secured to lower die half 314 and/or the inner surface of shroud 320. Lower shroud seal 342 is configured to form a seal between shroud 320 and lower die half 314 such that gasses do not communicate into or out of forming chamber 276 through any gap between shroud 320 and lower die half 314. In one or more embodiments, lower shroud seal 342 forms a continuous rectangular perimeter following the profile of shroud 320. Upper shroud seal 340, lower shroud seal 342, outlet seal 338 and a forming chamber inlet seal cooperate to prevent gasses from coming into forming chamber 276 when a vacuum is being drawn inside forming chamber 276.

Once a vacuum within a heating vacuum range is formed in third heating chamber 256 and within a feeding vacuum range in forming chamber 276, forming chamber inlet port enclosure 300 is changed from closed position 304 to the open position and third polymeric sheet material is transferred from third heating chamber 256 to forming chamber 276 while maintaining the heating vacuum range and the feeding vacuum range. The heating vacuum range and the feeding vacuum range may be the same range. In other embodiments, the heating vacuum range and the feeding vacuum range may be different. Once third polymeric sheet material is transferred from to forming chamber 276, forming chamber inlet port enclosure 300 is changed from the open position to closed position 304 and outlet port enclosure 332 remains in closed position 334 so that the feeding vacuum range is maintained within forming chamber 276.

Under the feeding vacuum range, upper die half 312 is lowered so that upper die half 312 and lower die half 314 is closed onto polymeric sheet material 258 so that polymeric sheet material takes on the shape of negative contour 316 and positive contour 318. The polymeric sheet material is held under pressure and compression as heat transfer occurs through upper and lower die halves 312 and 314 to facilitate cooling of polymeric sheet material 258 to set the shape of shaped article 344 and until a target demolding temperature is reached. In one embodiment, the vacuum in the feeding vacuum range is released once the target demolding temperature is reached. The vacuum in the feeding vacuum range may be released when both port enclosures 300 and 332 are in closed positions 304 and 334, respectively, and sealed. The upper die half 312 is then raised and the polymeric sheet material is raised so that it clears lower die half 314. Outlet port enclosure 332 is then rotated from closed position 334 to open position 336 to facilitate transfer of shaped article 344 on a conveyor (not shown) from forming chamber 276 to outside of forming chamber 276. Any excess material (not shown) around shaped article 344 may be trimmed away in a later processing step.

Figure 7:
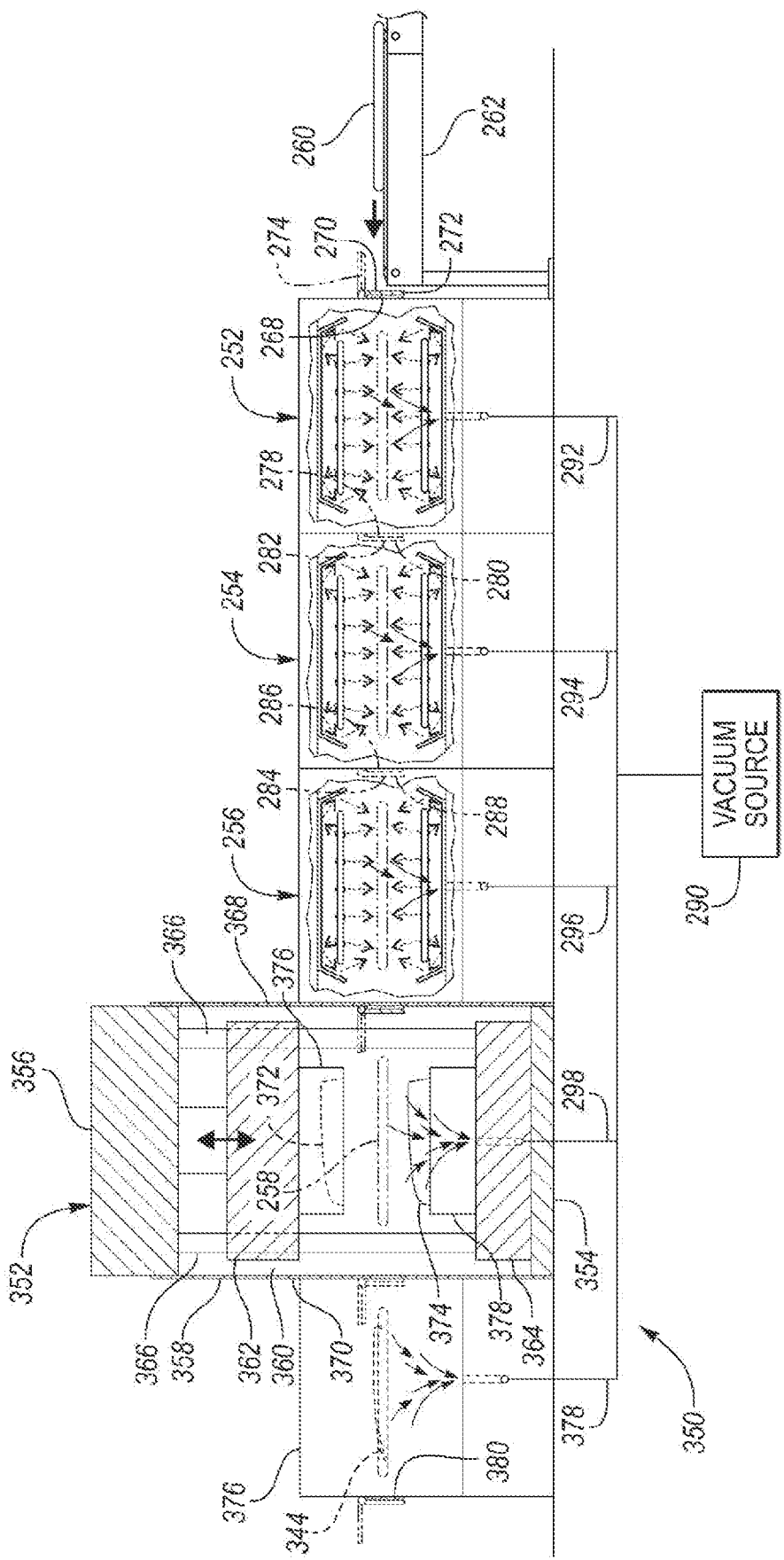
FIG. 7 is a cut away, side view and a partial cross-sectional view of a fourth system configured to implement a heated polymeric sheet material feeding process according to a fourth embodiment.

FIG. 7 is a partial, cut away, side view and a partial cross-sectional view of system 350 according to another embodiment. System 350 is an alternative to system 250. Both systems 250 and 350 include first, second, and third heating chambers 252, 254, and 256. While system 250 includes forming chamber 276, system 350 includes forming chamber 352.

Forming chamber 352 includes press bed 354 and press crown 356. In one or more embodiments, this configuration allows for the elimination of all sliding seals to sustain a vacuum. Forming chamber 352 also includes shroud 358. In one embodiment, press bed 354 and press crown 356 are fixed to shroud 358 such that press bed 354 and press crown 356 are stationary relative to shroud 358 and create a seal. In one embodiment, press bed 354 and press crown 356 have the same profile so that both are sealed against shroud 358 having a regular profile. Press bed 354, press crown 356, and shroud 358 are configured to create vacuum chamber 360 within forming chamber 352. Vacuum chamber 360 may be formed without any sliding seals, which may be prone to wear and/or leakage. Shroud 358 may also be fixed to third heating chamber 256. Third heating chamber 256 may be configured to heat polymeric sheet material 260 and transfer it to forming chamber 352 under vacuum conditions. Shroud 358 includes inlet panel 368 and outlet panel 370.

Forming chamber 352 also includes upper and lower platens 362 and 364 situated between press bed 354 and press crown 356. Upper and lower die halves 376 and 378 are secured to upper and lower platens 362 and 364, respectively. Forming chamber 352 also includes upright members 366. Upper die half 376 translates up and down inside of shroud 358 on upright members 366. Upper die half 376 has a negative contour 372 and lower die half 378 has positive contour 374.

System 350 also includes exit vacuum chamber 290. Exit vacuum chamber 290 (e.g., air lock) is configured to receive shaped article 344 when it is transferred out of forming chamber 352. As shown in FIG. 7, exit vacuum chamber 290 is external to forming chamber 352 and coupled to shroud 358 of forming chamber 352. Vacuum chamber 290 may be set at a pressure between atmospheric pressure and a vacuum pressure using vacuum conduit 378 and vacuum source 290. This configuration permits shaped article 344 to be transferred out of forming chamber 352 without completely depressurizing forming chamber 352. Depressurization may add time and expense associated with forming a subsequent vacuum condition with forming chamber 352. As shown in FIG. 7, shaped article 344 exits vacuum chamber 290 through outlet port 380.

Figure 8:
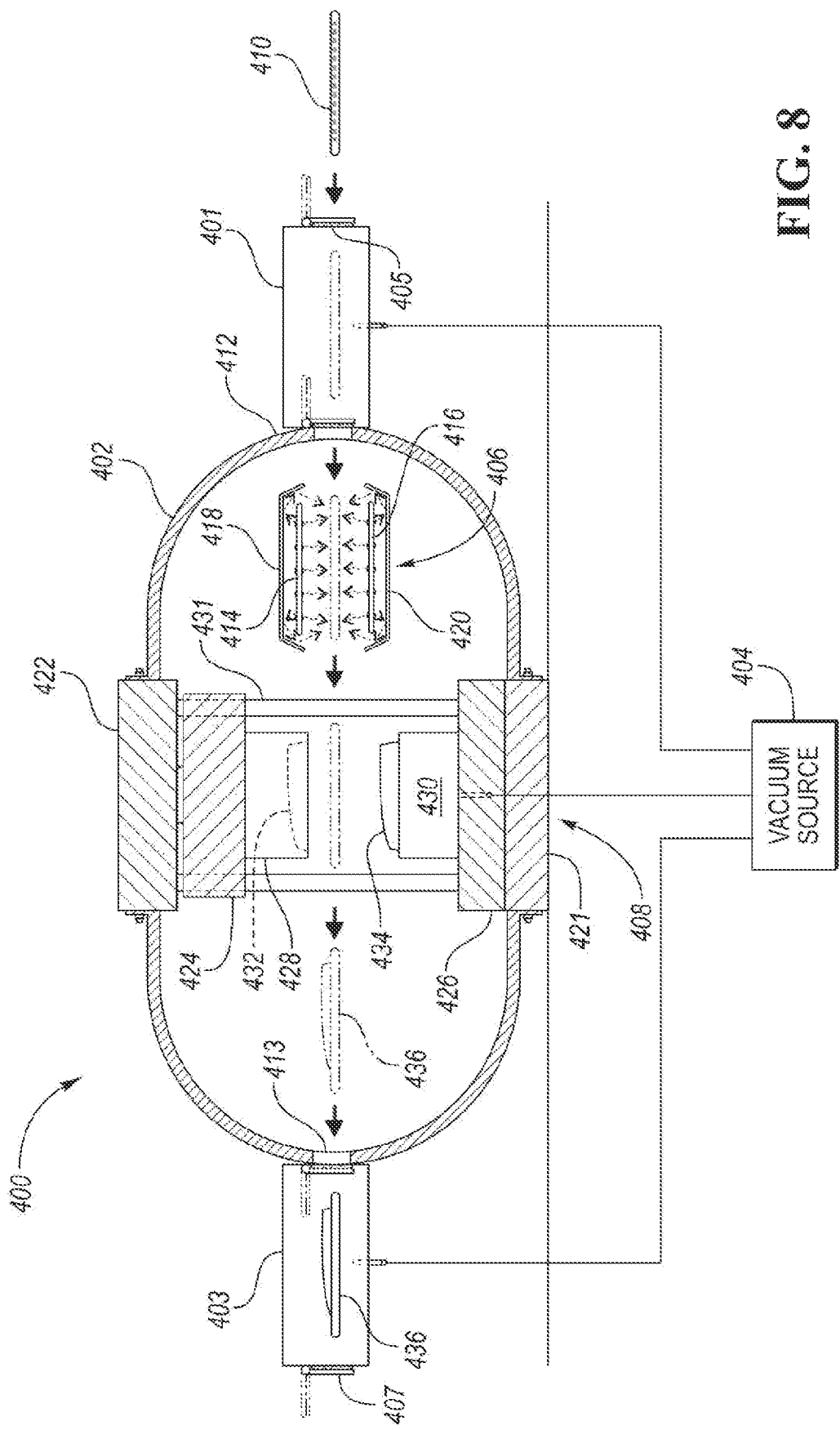
FIG. 8 is a cut away, side view and a partial cross-sectional view of system according to fifth embodiment.

FIG. 8 is a cut away, side view and a partial cross-sectional view of system 400 according to another embodiment. System 400 includes heating/forming chamber 402 (e.g., an autoclave combined with a press), inlet air lock 401, and outlet air lock 403. Inlet air lock 401 includes port 405 configured to admit polymeric sheet material 410. Inlet air lock 401 is in communication with heating/forming chamber 402 through port 412. Outlet air lock 403 includes port 407 configured to release shaped article 436 from outlet air lock 403. Outlet air lock 403 is in communication with heating/forming chamber 402 through port 413.

In one embodiment, the volume of heating/forming chamber 402 is significantly higher than the volume of inlet and outlet air locks 401 and 403. In one embodiment, a vacuum condition is created in the larger volume of heating forming chamber 402 by vacuum source 404 when ports 412 and 413 are closed and sealed. In one or more embodiments, the vacuum conditions may be an inert environment. Initially inlet air lock 401 is at external, ambient atmospheric conditions for loading polymeric sheet material 410. A vacuum condition is then created in inlet air lock 401 by vacuum source 404 after polymeric sheet 410 is admitted into inlet air lock 401 and ports 405 and 412 are closed. Once the vacuum condition is created in inlet air lock 401, port 412 is opened and polymeric sheet 410 is conveyed from inlet air lock 401 to heating/forming chamber 402, thereby maintaining vacuum conditions in heating/forming chamber 402. A vacuum condition is maintained by vacuum source 404 while shaped article 436 is formed by forming zone 408. Shaped article 436 is conveyed into outlet air lock 403 through port 413 in an open position and under vacuum conditions, thereby maintaining vacuum conditions in heating/forming chamber 402. Thereafter, port 413 is closed, then the conditions within outlet air lock 403 are stabilized with external, ambient conditions, and then port 407 is opened to release shaped article 436 from outlet air lock 403.

Heating/forming chamber 402 includes heating zone 406 and forming zone 408. Heating zone 406 is configured to elevate the temperature of polymeric sheet material 410 fed through port 412 into heating/forming chamber 402. Heating zone 406 includes upper and lower heating elements 414 and 416 and upper and lower heating shields 418 and 420. Upper and lower heating elements 414 and 416 heat polymeric sheet material 410 to a forming temperature to form a heated polymeric sheet material.

The heated polymeric sheet material may be transferred from heating zone 406 to forming zone 408 under vacuum conditions. By maintaining vacuum conditions within heating/forming chamber 402 while transferring the heated polymeric sheet material between heating zone 406 and forming zone 408, the amount of heat lost by the heated polymeric sheet material is reduced or eliminated. By maintaining the vacuum during the forming process, the possibility of cosmetic defects in the formed article and/or degradation of the mold from entrapped gases may be reduced and/or eliminated.

Forming zone 408 includes press bed 421 and press crown 422, which are affixed to heating/forming chamber 402 such that press bed 421 and press crown 422 are stationary relative to heating/forming chamber 402 and create a seal suitable for vacuum conditions.

Forming zone 408 also includes upper and lower platens 424 and 426 situated between press bed 421 and press crown 422. Upper and lower die halves 428 and 430 are secured to upper and lower platens 424 and 426, respectively. Forming zone 408 also includes upright members 431. Upper die half 428 translates up and down on upright members 431. Upper die half 428 has a negative contour 432 and lower die half 430 has positive contour 434. Port 413 is configured to release shaped article 436 into outlet air lock 403 when it is transferred out of forming zone 408.

The heating elements, ports, port enclosures, and forming chamber components may be actuated by a controller. The controller may include a processor that may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). In one or more embodiments, memory is in communication with the controller. The memory may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory may include multiple kinds of memory, particularly volatile memory and non-volatile memory. The memory may be a computer readable media on which one or more sets of instructions such as the software for operating the methods of the present disclosure, can be embedded. The instructions may embody one or more of the methods or logic as described herein. For example, the instructions may reside completely, or at least partially, within any one or more of the memory, the computer readable medium, and/or within the controller during execution of the instructions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A rigid thermoplastic polymeric sheet material forming process comprising:
heating, while under a heating vacuum range, a rigid thermoplastic polymeric sheet in one or more heating zones to a forming temperature to form a heated thermoplastic polymeric sheet material; and
transferring, while under a feeding vacuum range, the heated thermoplastic polymeric sheet material from the one or more heating zones to feed the heated thermoplastic polymeric sheet material into a forming zone under the feeding vacuum range; and
forming, in the forming zone, the heated thermoplastic polymeric sheet material into a formed article, the forming zone includes a forming chamber including a shroud, a crown, and a bed, the crown and the bed are fixedly connected to the shroud to seal the forming chamber.

2. The rigid thermoplastic polymeric sheet material forming process of claim 1, wherein the forming step is carried out using a thermoforming process.

3. The rigid thermoplastic polymeric sheet material forming process of claim 2, wherein the thermoforming process is a matched die forming process.

4. The rigid thermoplastic polymeric sheet material forming process of claim 1, further comprising transferring the formed article from the forming zone under an ambient or inert atmosphere.

5. The rigid thermoplastic polymeric sheet material forming process of claim 1, further comprising maintaining the feeding vacuum range in the forming zone across first and second forming cycles.

6. The rigid thermoplastic polymeric sheet material forming process of claim 1, wherein the heating step includes heating the rigid thermoplastic polymeric sheet in the one or more heating zones using one or more heating sources.

7. The rigid thermoplastic polymeric sheet material forming process of claim 6, wherein the one or more heating sources are selected from a group consisting of: a conductive heat source, an electromagnetic heat source, a radiant heat source, and a combination thereof.

8. The rigid thermoplastic polymeric sheet material forming process of claim 1, wherein the heated thermoplastic polymeric sheet material is a flowable polymeric sheet material at the forming temperature.

9. The rigid thermoplastic polymeric sheet material forming process of claim 1, wherein the rigid thermoplastic polymeric sheet includes multiple layers and/or plies.

10. The rigid thermoplastic polymeric sheet material forming process of claim 1, wherein the rigid thermoplastic polymeric sheet is gripped at one or more locations on the edge of the rigid thermoplastic polymeric sheet.

11. The rigid thermoplastic polymeric sheet material forming process of claim 1, wherein the transferring, while under the feeding vacuum range, step reduces heat loss from a surface of the heated thermoplastic polymeric sheet material as compared to transferring under ambient conditions.

12. The rigid thermoplastic polymeric sheet material forming process of claim 1, wherein the formed article is a cosmetic automotive component.

13. The rigid thermoplastic polymeric sheet material forming process of claim 1, wherein the crown and the bed are stationary members of the forming chamber.

14. A heated polymeric sheet material forming process comprising:
heating, while under a vacuum range, a polymeric sheet in one or more heating zones to a forming temperature to form a heated polymeric sheet material;
transferring, while under the vacuum range, the heated polymeric sheet material from the one or more heating zones to feed the heated polymeric sheet material into a forming zone under the vacuum range; and
forming, in the forming zone, the heated polymeric sheet material into a formed article the forming zone includes a forming chamber including a shroud, a crown, and a bed, the crown and the bed are fixedly connected to the shroud to seal the forming chamber.

15. The heated polymeric sheet material forming process of claim 14, wherein the one or more heating zones each includes first and second heating elements on first and second sides of the polymeric sheet, respectively.

16. The heated polymeric sheet material forming process of claim 14, further comprising maintaining the vacuum range during and between the heating and transferring steps.

17. The heated polymeric sheet material forming process of claim 14, wherein the formed article is a cosmetic automotive article.

18. The heated polymeric sheet material forming process of claim 14, wherein the crown and the bed are stationary members of the forming chamber.

* * * * *